A. SUNNÉN.
AUTOMOBILE RADIATOR PROTECTOR.
APPLICATION FILED FEB. 1, 1917.
1,268,892.
Patented June 11, 1918.
2 SHEETS—SHEET 1.
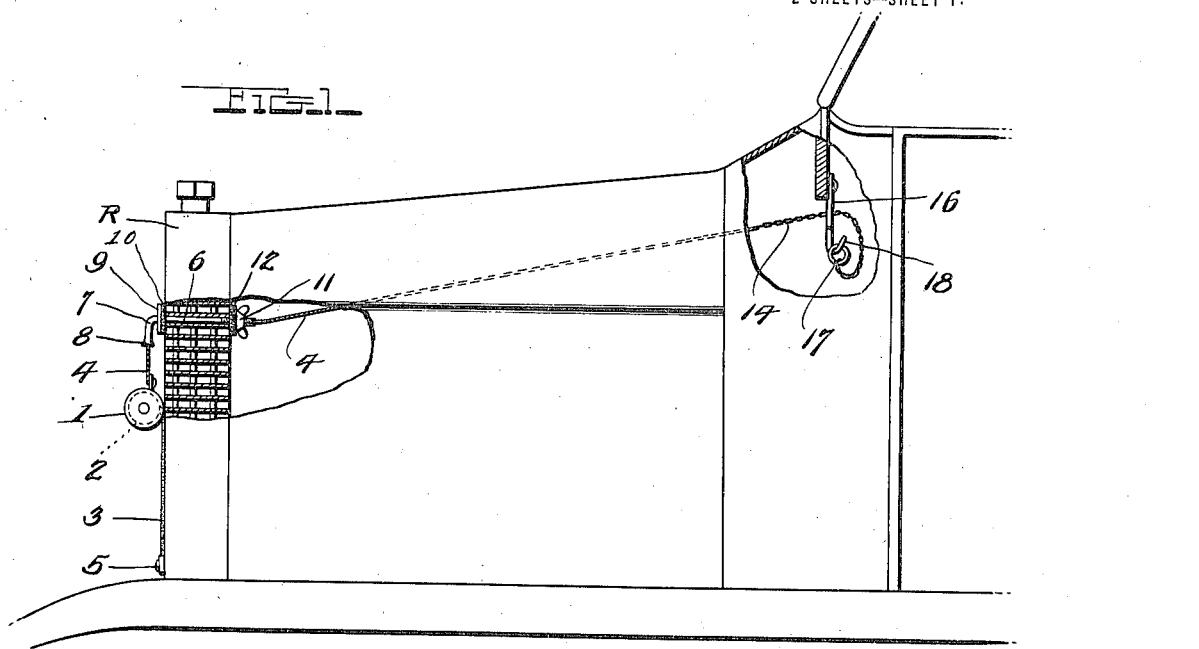
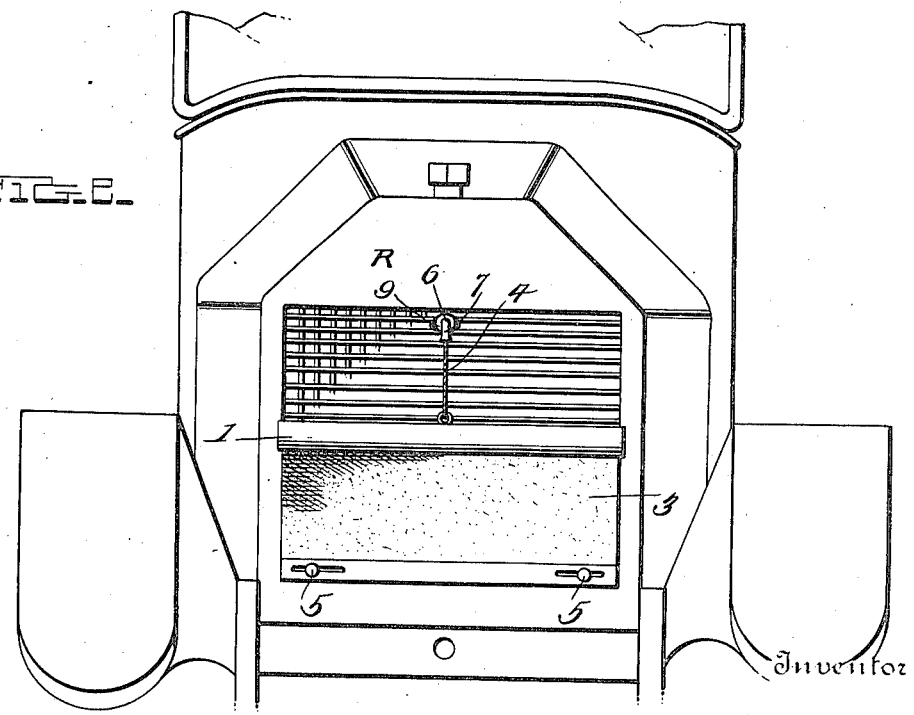
Witness
J. P. Pierce
Inventor
August Sunnen
By H. B. Willson & Co.
Attorneys A. SUNNEN.
AUTOMOBILE RADIATOR PROTECTOR.
APPLICATION FILED FEB. 1, 1917.
1,268,892.
Patented June 11, 1918.
2 SHEETS—SHEET 2.
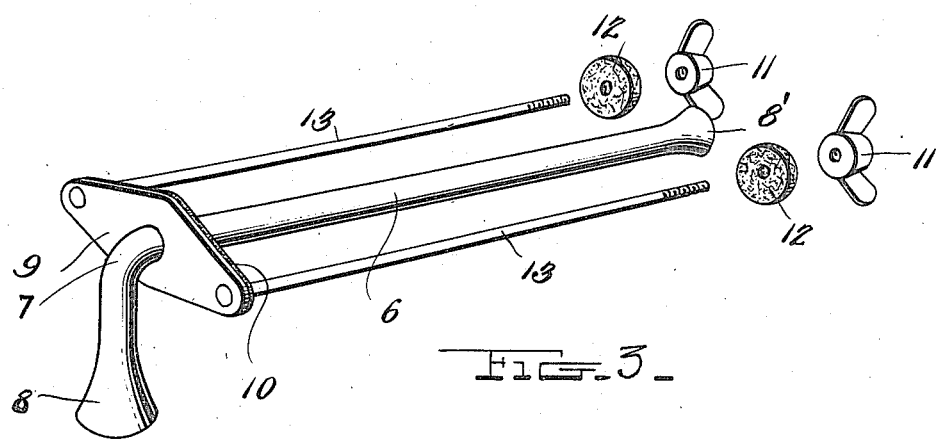
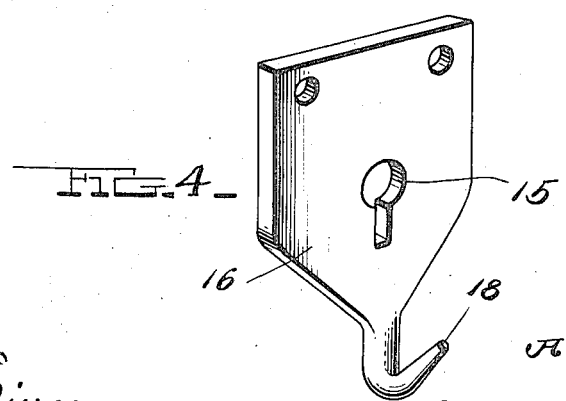
Witness
J. R. Pierce
Inventor
August Sunnen
By H. B. Willson &Co.
Attorneys

UNITED STATES PATENT OFFICE.

AUGUST SUNNEN, OF MEXICO, MISSOURI.

AUTOMOBILE-RADIATOR PROTECTOR.

1,268,892.   Specification of Letters Patent.   Patented June 11, 1918.

Application filed February 1, 1917. Serial No. 145,969.

*To all whom it may concern:*

Be it known that I, AUGUST SUNNEN, a citizen of the United States, residing at Mexico, in the county of Audrain and State of Missouri, have invented certain new and useful Improvements in Automobile-Radiator Protectors; and I do declare the following to be a full, clear, and exact description of the invention, such as will enable others skilled in the art to which it appertains to make and use the same.

My invention has for its principal object to provide simple and inexpensive yet efficient means for protecting automobile radiators against cold so that the engine may be maintained at the required temperature, the present device being provided with a control for the protector located in close proximity to the driver's seat whereby the protector may be drawn a greater or less extent over the radiator as occasion may demand.

Another object is to provide a novel means of guiding the control cord employed through the radiator.

With the foregoing general objects in view, the invention resides in the novel features of construction and unique combinations of parts to be hereinafter fully described and claimed, the descriptive matter being supplemented by the accompanying drawings which constitute a part of this application, and in which, Figure 1 is a side elevation partly in section of the front portion of an automobile showing the invention applied;

Fig. 2 is a front elevation of Fig. 1;

Fig. 3 is a perspective view of the cable guide shown in Figs. 1 and 2;

Fig. 4 is a perspective view of the anchor which is preferably provided for the rear end of the control cord.

In the drawings above described, the numeral 1 has reference to a suitable casing of a length equal to the width of the automobile radiator R upon which the device is to be used, said casing having therein a spring wound roller 2 upon which one end of a radiator protecting curtain 3 is wound. The free end of curtain 3 is shown in the present embodiment of the invention as being secured to the lower end of the radiator while the control cord or cable 4 is connected with the casing. When the arrangement shown is employed, bolts 5 will be passed through the curtain and extended rearwardly through the interstices of the radiator R which is shown of the usual honeycomb formation.

A guide tube 6 passes through one of the interstices at the upper end of the radiator to receive the cord 4 which extends rearwardly from said tube to a point adjacent the driver's seat. The front end of the tube 6 is bent downwardly at 7 and flared at 8 to facilitate the passage of the cord into the same, and adjacent this bend said tube is provided with a collar 9 secured thereon to prevent rearward movement of said tube, a soft washer 10 of leather or other suitable material being interposed between said collar and the radiator to prevent injury of the latter.

The rear end of the tube is flared outwardly to a slight extent as shown at 8'. The collar 9 extends laterally in opposite directions from the tube, the ends of said collar having openings through which the headed ends of a pair of small bolts 13 pass, the rear ends of these bolts being equipped with nuts 11 and soft washers 12 while the washer 10 conforms to the shape of the collar 9. The bolts 13 as well as the tube 6 are passed rearwardly through the radiator and after the nuts 11 are threaded up against the washers 12, the device will be effectively held in place. The type of guide is simple and inexpensive yet efficient and in no manner cumbersome or unattractive.

The rear end of the cord 10 may be equipped with any preferred fastening means or it may be wound on a drum if found desirable. For purposes of illustration I have shown a chain 14 connected to the rear end of said cord and passing through a keyhole slot 15 in an anchor plate 16 which may be secured to any preferred part of the vehicle so that the chain is within easy reach of the operator. The chain 14 is preferably provided on its free end with a ring 17 into which a hook 18 on the lower edge of the plate 16 projects, as shown.

By pulling rearwardly on the chain 14 and then slipping it into the contracted end of the slot 15, the cable 4 will adjust the casing 2 as occasion may demand and will then hold the same in adjusted position. In the present illustration, the curtain 3 is shown as located for covering more or less of the lower portion of the radiator.

From the foregoing, taken in connection with the accompanying drawings, it will be clear that although the device is extremely simple and inexpensive, it will be highly efficient.

I claim:—

1. In a device of the class described the combination with a radiator, a shield to be drawn over the front of an automobile radiator, and a flexible element for drawing and controlling the position of said shield and passing to a point near the driver's seat, of a guide tube for said element, dimensioned for passage through a radiator opening, said guide tube having a collar secured thereto, and bolts in the collar positioned to pass through radiator openings at the side of said tube, said bolts securing the tube to the radiator.

2. In a device of the class described the combination with a radiator, a curtain shield to be drawn over the front of an automobile radiator, and a flexible element for drawing and controlling the position of said shield and passing to a point near the driver's seat, of a guide tube for said element dimensioned for insertion into a radiator opening and having a downwardly curved front end, a collar on said tube arranged to lie against the front of the radiator and a bolt at each side of the tube in said collar arranged to pass through radiator openings at the side of the tube.

In testimony whereof I have hereunto set my hand in the presence of two subscribing witnesses.

AUGUST SUNNEN.

Witnesses:
W. W. FRY, Jr.,
W. W. FRY.